Aug. 11, 1959 D. M. CARR 2,899,285
CATALYTIC APPARATUS
Filed July 1, 1957 3 Sheets-Sheet 1
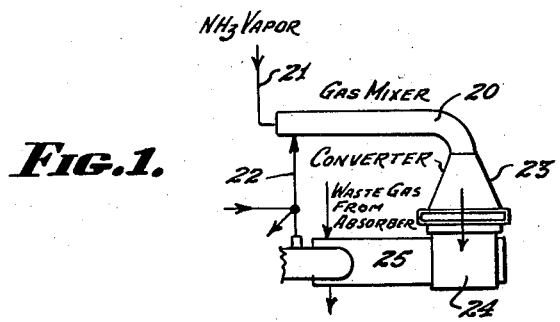
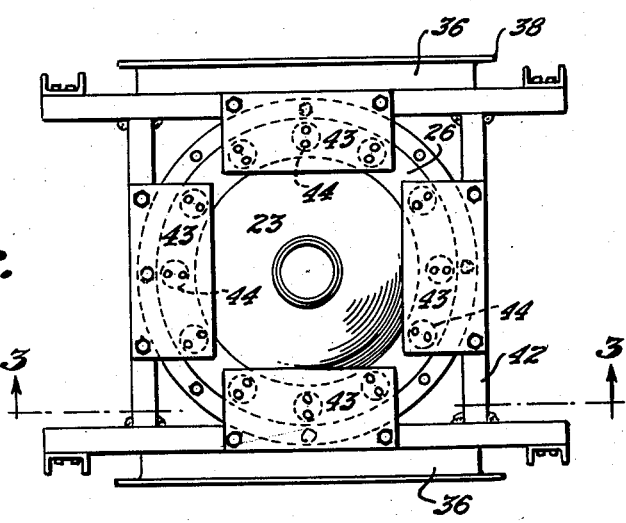
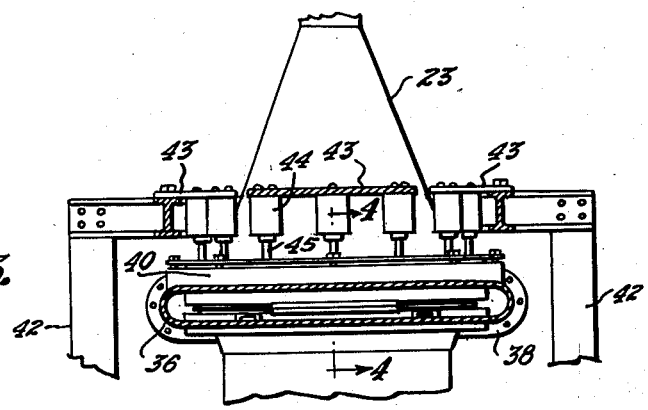
INVENTOR.
DUGALD M. CARR.
BY
ATTORNEYS.

Aug. 11, 1959  D. M. CARR  2,899,285
CATALYTIC APPARATUS
Filed July 1, 1957  3 Sheets-Sheet 2
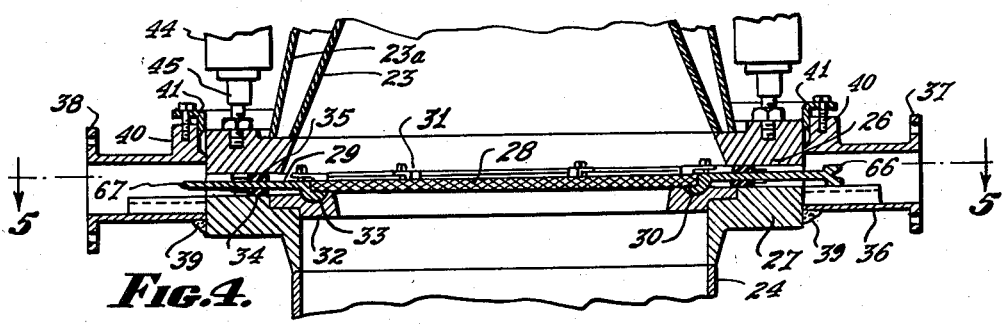
FIG. 4.
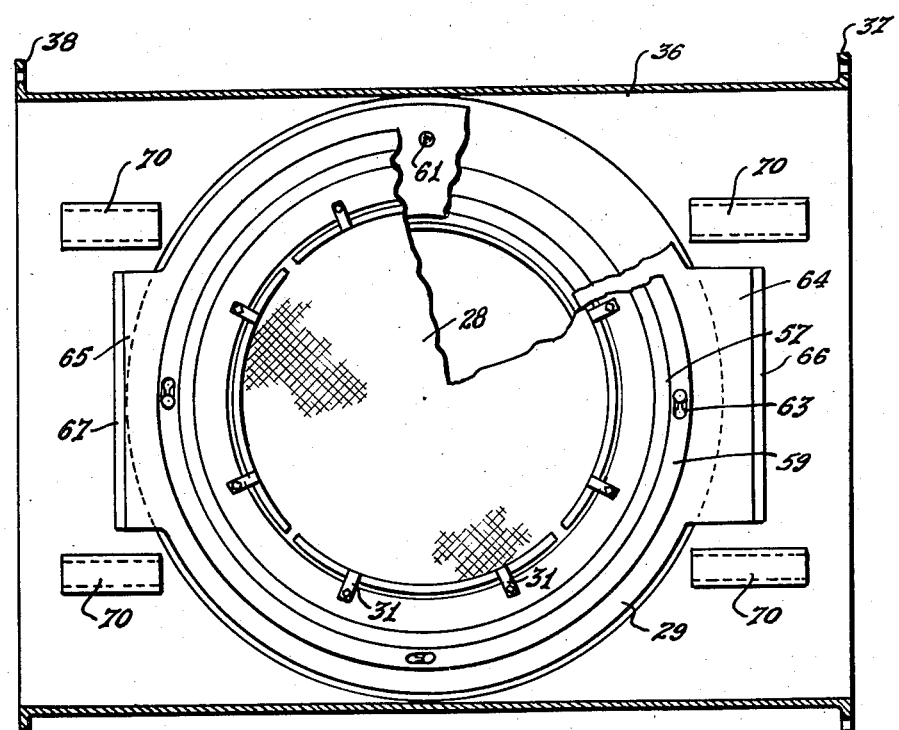
FIG. 5.
FIG. 6.
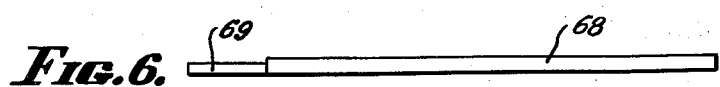
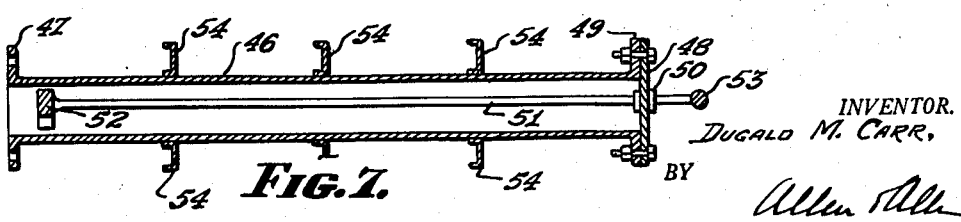
FIG. 7.
INVENTOR.
DUGALD M. CARR,
BY
ATTORNEYS.

Aug. 11, 1959 D. M. CARR 2,899,285
CATALYTIC APPARATUS
Filed July 1, 1957 3 Sheets-Sheet 3
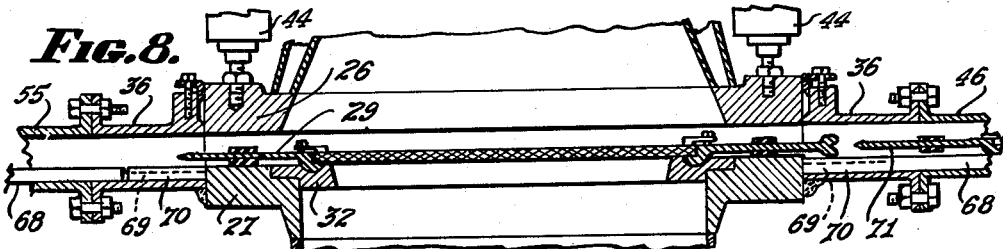
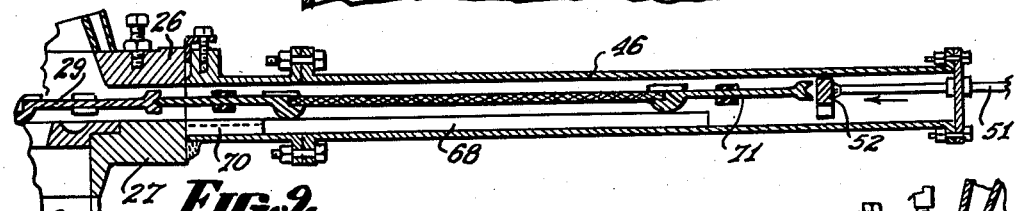
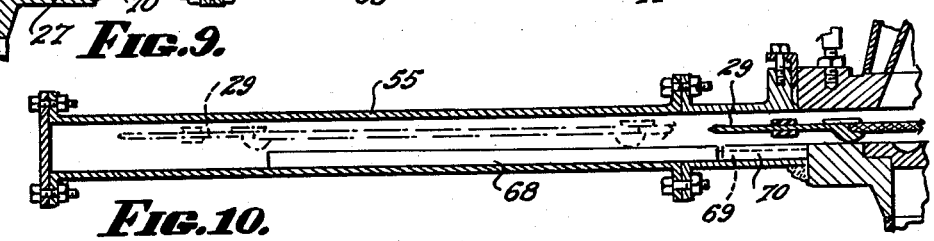
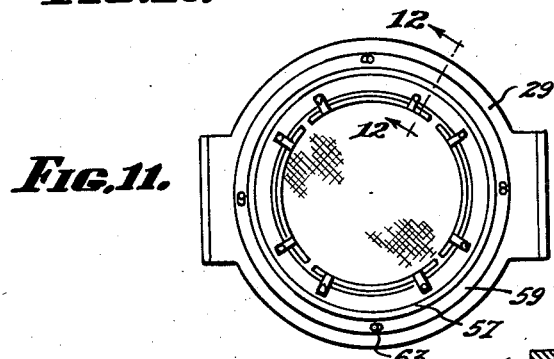
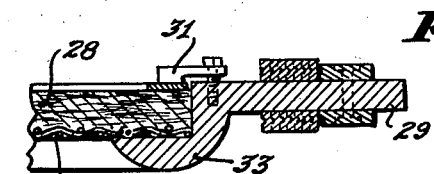
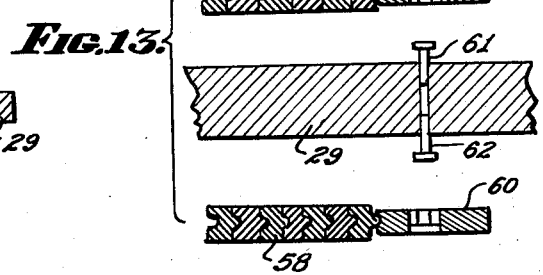
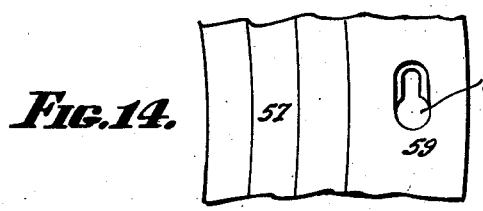
INVENTOR.
DUGALD M. CARR,
BY
ATTORNEYS.

United States Patent Office 2,899,285
Patented Aug. 11, 1959

2,899,285

CATALYTIC APPARATUS

Dugald M. Carr, Milford, Ohio, assignor to The Chemical and Industrial Corp., Cincinnati, Ohio, a corporation of Ohio Application July 1, 1957, Serial No. 668,969

17 Claims. (Cl. 23—288)

This invention relates to apparatus in which chemical reactions are carried on between reagents (usually though not necessarily in gaseous form) under the influence of catalytic materials in the form of a bed or pervious layer through which the reagents are passed. For purposes of an exemplary disclosure herein, the invention will be described in connection with the manufacture of nitric acid by the oxidation of ammonia, it being understood that the invention has application wherever catalysts are employed as set forth above.

As is well known, in the manufacture of nitric acid by the ammonia oxidation process, ammonia is vaporized, mixed with air and passed through a catalyst which is usually though not necessarily in the form of a gauze or fine screen of such metallic materials as platinum, rhodium, palladium, and others or mixtures of metals. The ammonia and the oxygen react to form nitric oxide and water. The nitric oxide is then further oxidized to form nitrogen dioxide, which is absorbed in water to form nitric acid in accordance with the simplified reaction:

$$3NO_2 + H_2O \rightarrow 2HNO_3 + NO$$

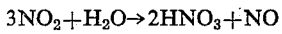

For each two moles of nitric acid formed, one mole of nitric oxide is left. In an efficient process this nitric oxide is reoxidized for the formation of more nitric acid.

The various reactions which have been indicated occur in a closed system including a mixer for the initial gases, a converter in which the initial reaction proceeds under catalytic conditions, various heat exchangers, condensers, absorption apparatus, compressors and the like. High temperatures are generated, particularly in the catalytic reaction. At various places in the apparatus, where gases must be cooled, attempts are made to save the heat vaules in them through the use of waste heat boilers and the like. The waste gases from the absorption tower or towers generally contain a residue of oxides of nitrogen, which can be removed by catalytically combining them with fuel and recovering the heat in a waste heat boiler, all as is set forth in the copending application of Carr and Striggles entitled Purification of Gases Containing Oxides of Nitrogen, Serial No. 592,975, filed June 21, 1956. Reference may be made to this copending application for a disclosure of a complete process for making nitric acid by the ammonia oxidation process.

The apparatus involved is complicated and extensive, most of it operating at relatively high temperatures. The process may be carried on under relatively low pressures within the system, in which event the catalysts last for relatively long periods. However, it is generally preferable to carry on such processes at relatively high pressures within the apparatus, say pressures of 110 pounds per square inch gauge, by way of example. Under these conditions the output and productivity of apparatus of a given internal volume is very greatly increased; but at the same time the catalyst suffers relatively rapid deterioration from various causes including erosion. Thus, in a high pressure system for the manufacture of nitric acid in the manner indicated above, it may be found necessary to change the catalyst as frequently as once in every two weeks, or even more often still. In such systems as hitherto constructed and used, changing the catalyst requires stoppage of the entire process, cooling of the gases, complete relief of the internal pressures, and a disassembly of some parts of the apparatus. Thus, it is not unusual to lose an entire day's production whenever a change of catalyst becomes necessary.

The primary object of this invention is the provision of means and a method whereby the catalyst may be easily and inexpensively changed without shutting down the apparatus or interrupting the process.

This basic object and others which will be set forth hereinafter or will be apparent to one skilled in the art upon reading these specifications, are accomplished in that apparatus and by that procedure of which an exemplary embodiment will now be described. Reference is made to the accompanying drawings wherein:

Fig. 1 is a partial elevational view of an assembled apparatus including a gas mixer, a converter comprising a top portion and a bottom portion and a part of a heat exchange apparatus.

Fig. 2 is a plan view of the top portion of the converter apparatus.

Fig. 3 is a sectional view taken along the line 3—3 of Fig. 2.

Fig. 4 is an enlarged sectional view through the two parts of the converter apparatus and showing the relationship thereto of catalyst holding mechanism.

Fig. 5 is a sectional view taken along the line 5—5 in Fig. 4.

Fig. 6 is an elevational view of a rail element.

Fig. 7 is a longitudinal sectional view of an auxiliary chamber means as hereinafter described.

Fig. 8 is a sectional view of a portion of the converter showing the two parts in separated condition and a catalytic agent therebetween about to be changed.

Fig. 9 is a similar view of one of the auxiliary chamber elements containing a fresh catalytic element about to be substituted for the used one in Fig. 8.

Fig. 10 is a similar view of the other auxiliary chamber showing the position which will be occupied by the used catalytic element after the substitution.

Fig. 11 is a plan view of one of the catalytic elements employed in the invention.

Fig. 12 is a partial sectional view taken along the line 12—12 of Fig. 11.

Fig. 13 is an exploded sectional view showing a mode of attaching gasket elements to the catalytic element.

Fig. 14 is a partial plan view showing the nature of the same assembly.

As has hereinabove been indicated, the converter section of the apparatus is made in upper and lower parts, while the catalyst is mounted in a holder which lies between these parts and is sealed to them. Thus, a mixture of gases entering the upper part of the converter is caused to pass through the catalyst in the catalyst holder and the reaction products enter the lower part of the converter. Briefly, in the practice of this invention, its objects are attained by building a chamber around the converter at that point where the two parts thereof come together, the chamber being such that pressure can be maintained therein. At either end of this chamber there are detachable auxiliary chambers in which pressure can also be maintained. Each of these auxiliary chambers is designed and adapted to receive or discharge a catalyst holder, as will hereinafter be more fully explained. Provision is made whereby pressure may be built up in these chambers; and provision is also made whereby the upper portion of the converter may be raised with respect to the lower portion while pressure is maintained in the chambers. Thus, the catalyst holder which is in place between the two portions of the converter is freed. If one of the auxiliary chambers contains a catalyst holder with fresh catalyst in it, and is equipped with suitable pushing means, the replacement catalyst holder can be caused to push the used catalyst holder from between the two portions of the converter and to deliver it to the opposite auxiliary chamber. The fresh catalyst holder takes the place of the used one. The two parts of the converter can now be brought together in a sealing relationship against the new catalyst holder. When this is done, the pressure may be relieved in the auxiliary chambers without affecting the general pressure in the apparatus, and thereupon one or both of the auxiliary chambers may be removed. That auxiliary chamber, which contains the used catalyst holder, will be removed so that the catalyst holder may be withdrawn and the catalyst subjected to treatment or to catalyst recovery. The other chamber can have a fresh catalyst holder introduced into it. The apparatus may then be reassembled, ready for the next period at which there should be a change of catalyst.

Referring now to Fig. 1, the index numeral 20 indicates a gas mixer in which ammonia vapor may be introduced through a conduit 21 and heated filtered air through a conduit 22. The mixed gases enter the top portion 23 of the converter and pass through a catalyst located between the top converter portion 23 and a lower converter portion 24. The catalytically controlled reaction takes place and the gases enter the portion 24 at high temperature, and may be delivered to a heat exchange apparatus indicated generally at 25. As will be apprecicated best from Fig. 4, the upper part of the converter 23 (usually although not necessarily of conical form, and provided with a water jacket 23a for cooling purposes) is provided with a bottom flange 26. The lower portion of the converter (indicated at 24) is provided with an upper flange 27. The catalyst (usually although not necessarily in the form of a plurality of layers of metallic gauze 28) is held in an annular member 29. This annular member has an annular, downwardly extending part 30, the upper side of which forms a ledge for the reception of the gauze catalyst assembly 28. The assembly may be held on this ledge by means of clamp members 31. The flange 27 of the lower part 24 of the converter is preferably provided with a shoe 32 having a depression 33 to receive the under side of the ledge member of the catalyst holder. Gaskets, indicated at 34 and 35, seal the annular catalyst holder to the flanges 26 and 27. In ordinary apparatus, these flanges are simply bolted or clamped together.

In the apparatus of this invention, a chamber 36 (see Fig. 5) is built around that portion of the apparatus where the two parts of the converter come together. This chamber is elongated and rectangular in form, and at its ends it has flanges indicated at 37 and 38. The lower wall of the chamber is, of course, cut away to receive the flange 27 of the lower converter part 24, and is preferably welded thereto in a gas-tight fashion, as at 39. The upper wall of the chamber 36 is provided with a flange 40 encircling the flange 26 of the upper converter member. A packing gland 41 or the like is compressed between the flanges 26 and 40 so that the upper part of the converter can be moved relatively to the chamber 36 without loss of pressure between the flanges.

Means are provided to raise and lower the upper portion 23 of the converter. As will be best appreciated from Figs. 2 and 3, a framework of suitable strength, indicated generally at 42, is set up surrounding the upper part of the converter, and is suitably attached to the lower part of the converter 24, or to its support. Plates 43 are attached to the framework so that the inner edges of these plates overlie the flange 26 of the upper converter member. A series of hydraulic cylinders is attached to these plates. The pistons of the cylinders 34 (indicated at 45) are attached to the flange 26 of the upper converter member. It will be understood that with suitable hydraulic actuation of the cylinders 44 (not shown) this arrangement will serve either to raise the upper part of the converter as shown in Fig. 8, or to lower it as shown in Fig. 4, clamping the catalyst holder between the flanges 26 and 27.

A pair of auxiliary chambers is provided. One of these is illustrated in Fig. 7. It comprises an elongated body portion 46 of the same general cross-sectional shape as the chamber 36. The body portion is provided upon one end with a flange 47, by means of which it can be attached to the flange 37 of the chamber 36. With the interposition of suitable gasket material between the flanges, a gas-tight joint will be achieved. The other end of the auxiliary chamber 46 is closed by means of a plate 48 bolted to a flange 49. Through suitable glands 50 in the plate 48, a pair of push rods 51 extend. These rods on their inner ends carry a pushing abutment 52 and on their outer ends are provided with a suitable handle 53. Due to the relatively flat cross-sectional shape of the auxiliary chamber 46, it may be strengthened against deflection under gas pressure through the use of transverse ribs indicated in Fig. 7 at 54.

As will be seen in Fig. 8, the auxiliary chamber 46 will be attached to the chamber 36 at one end, while another similar auxiliary chamber 55 will be attached to the chamber 36 at its other end.

As has been indicated, the catalyst will usually take the form of a plurality of layers of gauze 28 made, say, of platinum-rhodium wire. The relatively fine gauze layers usually rest on a support made from a wire screen of heavier character and coarser mesh, indicated in Fig. 12 at 56. The precise nature of the catalyst, however, does not form a limitation on this invention. Moreover, the depth of the catalyst holder may be varied as desired. Thus, instead of using a catalyst in the form of a fine wire screen, catalysts in the form of a bed of ceramic or other inert particles, coated with active catalyst, may also be employed. Normally, such catalysts would be confined between upper and lower wire screen members.

The catalyst holder comprises the annular body 29 which has already been described; but for purposes of this invention, it is desirable that this annular body carry it own gaskets. Reference to Figs. 12, 13 and 14 will indicate that this may be readily accomplished by employing annular interlocking gasket elements of suitable substance shown at 57 and 58 which are held in place be metallic rings 59 and 60. The body of the catalyst holder is provided with headed studs 61 and 62, while the metal rings 59 and 60 are provided with perforations 63 of elongated form, one end of which is large enough to receive the head of the stud, while the other end has a recessed portion adapted to engage beneath the head of the stud, all as will be readily understood by the skilled worker in the art.

The catalyst holder, as shown in Figs. 5 and 11, is provided at opposite sides with projections 64 and 65 so that it may be engaged by or may engage other catalyst holders. The projection 64 is indicated in Figs. 4, 8 and 9 as having a fork-like configuration 66 at its outer edge, while the opposite projection 65 is beveled as at 67.

The auxiliary chambers 46 and 55 are provided with rail members (Fig. 6). These rail members have bodies 68 and reduced outer ends 69 which project from the ends of the auxiliary chambers. The chamber 36 (Fig. 5) has suitably located socket members 70 to receive the ends 69 of the rail members. This provides for the sliding of the catalyst holders into and out of the auxiliary chambers, as will be readily understood from Figs. 8, 9 and 10.

Fig. 4 shows an operating condition of the apparatus in which the catalyst holder 29 is clamped between and sealed to the flanges 26 and 27 of the upper and lower members of the converter element. If it is now wished to change the catalyst member, the auxiliary chambers 46 and 55 may be attached to the ends of the chamber 36, as shown in Fig. 8. The chamber 46 will carry a catalyst holder 71 containing fresh catalyst. The chamber 55 will be empty. The next step is preferably to build up pressure in the chamber 36 and the auxiliary chambers equal to the pressure within the converter. In the particular apparatus described for the production of nitric acid by the oxidation of ammonia, this pressure may be simply built up by connecting one of the chambers to a source of air under pressure since air is mixed with the ammonia in the process. Once the pressure has been built up in the chambers, the upper portion of the converter may be raised as shown in Fig. 8 so that its flange 26 comes away from the flange 27 and releases the catalyst holder 29. Now, as most clearly shown in Fig. 9, the push rods 51 may be actuated in the chamber 46. This may be done by hand or under power as desired. The pushing abutment 52 will engage the end of the fresh catalyst holder 71 and will bring it against the used catalyst holder 29 as clearly indicated in that figure. Continued actuation of the rods 51 will cause the catalyst holder 71 to displace the catalyst holder 29 from its seat in the shoe 32 and to cause it to enter the chamber 55 as illustrated in Fig. 10. Continued motion will cause the catalyst holder 71 to seat in the shoe 32. When this seating has been accomplished, the hydraulic cylinders 44 may be actuated in the opposite direction to bring the flange 26 toward the flange 27 and seal the upper and lower portions of the converter against the catalyst holder. When this has been accomplished, the pressure may be relieved in the chamber 36 and the auxiliary chambers 46 and 55 without affecting the pressure in the converter. The chamber 55 may be removed and the used catalyst holder taken from it for such treatment as may be desired. The chamber 46 may be removed and a fresh catalyst holder replaced in it for subsequent use.

The entire operation of changing catalyst in accordance with the present invention occupies only a few minutes, does not require any interruption in the chemical process being carried on in the apparatus, and requires no relief of pressure in the general system. Production is not interrupted.

Modifications may be made in the invention without departing from the spirit of it. Having thus described the invention in an exemplary embodiment, what is claimed as new and desired to be secured by Letters Patent is:

1. In catalytic apparatus, a converter element formed in two relatively movable parts, a catalyst holder having a portion adapted to lie between said two parts in sealing relationship with the ends thereof, a pressure chamber surrounding at least the juncture of the said two parts, said pressure chamber being sealed relative to each of said parts irrespective of relative movement between said parts, means for forcibly separating said parts, and means movable within said chamber to displace said catalyst holder and substitute a fresh one between the said parts, and means for bringing said parts together in sealed relationship to said fresh catalyst holder.

2. In catalytic apparatus, a converter formed in two relatively movable parts, with opposed flanges between the parts, a catalyst holder having a body portion adapted to lie between said flanges in sealing relation thereto, a chamber in which pressure may be maintained surrounding the said flanges and having a sealing relationship therewith, and auxiliary chambers attachable to opposite ends of said first mentioned chamber, each of said auxiliary chambers being of a size to receive a catalyst holder, and at least one of said chambers being provided with pushing means, means for maintaining said chambers under pressure equal to the pressure in said converter, and means for moving apart the flanges of said converter while maintaining the sealed relationship between said chamber and said two parts, whereby a catalyst holder in one of said auxiliary chambers can be caused to displace the catalyst holder located between said flanges and deliver it to the opposite auxiliary chamber while positioning a fresh catalyst holder between the said flanges, and means for bringing said flanges together under pressure against said fresh catalyst holder.

3. The structure claimed in claim 2 in which said catalyst holders have peripheral body portions and opposite end portions adapted to engage each other in pushing relationship.

4. The structure claimed in claim 3 wherein the flange on one of the portions of said converter provides a seat for a downwardly depending portion of the catalyst holders.

5. The structure claimed in claim 4 wherein said catalyst holder carries gaskets on its upper and lower surfaces for sealing against said flanges.

6. In catalytic apparatus, a converter formed in two parts, each part having a flange adapted to engage the body of a catalyst holder located between said flanges, a pressure chamber formed around said flanges in sealing relationship thereto, means mounting the upper part of said converter for movement relative to the remaining part and to said chamber, said chamber having an upper flange connected with the flange of the upper part of said converter by means of a gasket, said chamber having opposite extensions each of a size to contain a catalyst holder, a frame connected with the lower portion of said converter, hydraulic means on said frame connected with the flange of the upper portion of said converter for effecting movement thereof, and means in at least one of said extensions for pushing a catalyst holder between said flanges of the said converter so as to displace a catalyst holder previously located therebetween, and deposit it in the opposite one of said extensions.

7. A catalyst holder having an annular body with a central portion adapted to receive a catalyst, said annular body bearing annular sealing gaskets on its upper and lower surfaces, and extensions on the opposite sides of said annular body for pushing purposes, one of said extensions having a forked end and the opposite extension being beveled.

8. In catalytic apparatus, a converter formed in two relatively movable parts with opposed flanges, catalyst holders having body portions adapted to be engaged between the said flanges in sealing relationship thereto, an elongated housing formed about said converter at the position of said flanges, said housing being attached in a gas-tight fashion to one of said flanges, and having connection with the other of said flanges through a gas tight gland, means for building up in said housing a pressure equal to the pressure within said converter, means for effecting relative movement of said flanges to separate them, means within said housing for displacing a catalyst holder located between said flanges, and replacing it with a fresh one, means for bringing said flanges against said fresh catalyst holder under pressure and means in connection with said housing permitting the withdrawal of said used catalyst holder and the insertion of a new catalyst holder.

9. In a reactor for conducting chemical reactions under catalytic conditions, a pair of converter parts having coacting flanges between which a catalyst holder is adapted to be clamped, means mounting said parts for movement from a holder clamping position to a holder releasing position, a pressure chamber surrounding said two parts in sealed relationship therewith irrespective of relative movement between said two parts, means within which pressure may be maintained on one side of said pressure chamber for positioning a catalyst holder for insertion between said parts upon movement of said parts to holder releasing position, and means within which pressure may be maintained on the opposite side of said chamber for receiving a catalyst holder removed from between said parts.

10. The converter claimed in claim 9 including a catalyst holder adapted to be clamped between the flanges of said converter parts, said holder having gasket means on its opposite surfaces for sealing contact with said flanges.

11. The converter claimed in claim 10 wherein said catalyst holder has a leading edge and a trailing edge, and wherein pusher means are associated with the means for positioning a holder for insertion between the flanges of said converter parts, and wherein said pusher means is adapted to make pushing contact with the trailing edge of said holder.

12. The converter claimed in claim 11 wherein the leading edge of said holder is configured to make pushing contact with the trailing edge of a holder already positioned between the flanges of said converter parts, whereby the holder between said parts will be displaced by the incoming holder and delivered to the said means for receiving holders removed from between said parts.

13. In catalytic apparatus, a converter formed in two relatively movable parts, means mounting said parts for movement from a holder engaging to a holder releasing position, a pressure chamber surrounding at least the juncture of said two parts, said pressure chamber making sealing contact with said parts irrespective of their movement relative to each other, means on one side of said chamber for inserting a holder between said parts, and means on the opposite side of said chamber for receiving a holder displaced from between said parts by an incoming holder.

14. The converter claimed in claim 13 wherein said means for receiving a holder displaced from between said converter parts comprises an auxiliary chamber mounted in sealed relationship with respect to said first named chamber, and wherein a second auxiliary chamber is positioned on the opposite side of said first named chamber for receiving and positioning holders to be inserted between the said parts of said converter.

15. The converter claimed in claim 14 wherein said first named chamber and said auxiliary chambers are provided with means for maintaining a predetermined pressure therein.

16. The converter claimed in claim 15 wherein the two parts of the said converter comprise an upper part and a lower part, wherein said lower part is fixedly secured to said first named chamber, and wherein said upper part is movably mounted relative to said first named chamber, there being gasket means between said upper part and the said chamber for maintaining sealed contact therebetween irrespective of the movement of said upper part.

17. The converted claimed in claim 16 including hydraulic means operatively connected to said upper part for moving it relative to said lower part.

References Cited in the file of this patent
UNITED STATES PATENTS

| | | |
|---|---|---|
| Re. 21,107 | Seitz | May 30, 1939 |
| 1,749,080 | Mathers | Mar. 4, 1930 |
| 2,510,984 | Kulp | June 13, 1950 |